United States Patent
Nobis et al.

(10) Patent No.: US 8,948,444 B2
(45) Date of Patent: Feb. 3, 2015

(54) METHOD FOR DETERMINING THE TUMBLING MOTION OF A VEHICLE WHEEL

(75) Inventors: Guenter Nobis, Nuertingen (DE); Steffen Abraham, Hildesheim (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 13/637,851

(22) PCT Filed: Mar. 2, 2011

(86) PCT No.: PCT/EP2011/053064
§ 371 (c)(1),
(2), (4) Date: Dec. 17, 2012

(87) PCT Pub. No.: WO2011/120749
PCT Pub. Date: Oct. 6, 2011

(65) Prior Publication Data
US 2013/0089233 A1    Apr. 11, 2013

(30) Foreign Application Priority Data

Mar. 30, 2010   (DE) .......................... 10 2010 003 461

(51) Int. Cl.
*G06K 9/00*    (2006.01)
*G06K 9/46*    (2006.01)
(Continued)

(52) U.S. Cl.
CPC ................ *G06K 9/46* (2013.01); *G01B 11/275* (2013.01); *G01M 17/013* (2013.01); *G01B 2210/14* (2013.01)
USPC ........................................................ 382/100

(58) Field of Classification Search
USPC ....................................... 356/139.09; 382/100
See application file for complete search history.

(56) References Cited

U.S. PATENT DOCUMENTS

| 3,892,042 A | | 7/1975 | Senften |
| 4,336,658 A | * | 6/1982 | January et al. .................. 33/288 |
| 5,532,816 A | * | 7/1996 | Spann et al. ............. 356/139.09 |

(Continued)

FOREIGN PATENT DOCUMENTS

| DE | 23 13 087 | 3/1979 |
| DE | 197 57 763 | 7/1999 |
| EP | 1 857 774 | 11/2007 |

OTHER PUBLICATIONS

International Search Report, PCT International Application No. PCT/EP2011/053064, dated Apr. 27, 2011.

*Primary Examiner* — Gregory F Cunningham
(74) *Attorney, Agent, or Firm* — Kenyon & Kenyon LLP

(57) ABSTRACT

A method for determining the tumbling motion of a vehicle wheel and/or a measurement object attached to the vehicle wheel in the context of an axle measurement. The tumbling motion is executed relative to the precise wheel axis of rotation of the vehicle wheel and at least one orientation value is determined between the precise wheel axis of rotation and a reference axis. Using at least one image recording unit, at least two wheel features that are present on the vehicle wheel or are attached for the measurement are acquired as the vehicle travels past and are evaluated by an evaluation device situated downstream. Using the wheel features recorded as the vehicle travels past, a wheel coordinate system and a feature coordinate system are determined. The wheel coordinate system and the feature coordinate system are set into relation to one another in order to determine the orientation value.

12 Claims, 2 Drawing Sheets

(51) Int. Cl.
*G01B 11/275* (2006.01)
*G01M 17/013* (2006.01)

(56) References Cited

U.S. PATENT DOCUMENTS 6,069,966 A    5/2000   Jones et al.
6,313,911 B1 * 11/2001  Stieff ................... 356/139.09
6,341,013 B1 *  1/2002  Battiti et al. .......... 356/139.09
6,404,486 B1    6/2002  Nobis et al.
6,483,577 B2 * 11/2002  Stieff ................... 356/139.09
7,535,558 B2 *  5/2009  Uffenkamp et al. ........ 356/138
7,746,456 B2 *  6/2010  Braghiroli .............. 356/155
2001/0022655 A1 * 9/2001 Stieff ................... 356/139.09

* cited by examiner

METHOD FOR DETERMINING THE TUMBLING MOTION OF A VEHICLE WHEEL

FIELD OF THE INVENTION

The present invention relates to a method for determining the tumbling motion of a vehicle wheel or to a method for determining the tumbling motion of a measuring object attached to the vehicle wheel, in the context of the axle measurement.

BACKGROUND INFORMATION

German Patent No. DE 2313087 C3 describes a device for determining the tumbling motion of a rotating body relative to its actual axis of rotation. Here, a reference element is fastened on the rotating body that produces a sinusoidal reference value analogous to the tumbling motion of the body. Control elements offset by 180° are used for orientation in a first specified plane and in a plane rotated by 90° relative to the first plane. The present invention makes use of the fact that the tumbling motion of a wheel follows a sinusoidal curve when the wheel rotates. If the tumbling motion is acquired at two measurement points situated 180° from one another, and the two measurement values are summed and divided by two, a mean value can be obtained that indicates the actual plane of rotation of the wheel.

European Patent No. EP 1857774 B1 describes a contactless method for wheel runout compensation. Here, the angle of rotation of the wheel is calculated from the rolling path of the wheel on the one hand and the associated effective rolling radius on the other hand, the rolling path of the wheel being determined via the slide path of the sliding plates. Here, not only the beginning and the end of the slide path are measured; rather, continuous path measurements must be carried out. The determination of the effective rolling radius of the wheel preferably takes place from camera image data of the wheel during its rotation.

SUMMARY

An example method according to the present invention may include the determination of the tumbling motion of a vehicle wheel and/or the determination of the tumbling motion of a measurement object attached to the vehicle wheel relative to a precise wheel axis of rotation. Using at least one image recording unit, as the vehicle travels past at least two wheel features that are present on the vehicle wheel or are attached thereto for the measurement, or a measurement object attached to the vehicle wheel and having wheel features present thereon, are acquired and are evaluated by an evaluation device situated downstream. Using the wheel features recorded during travel, a wheel coordinate system KO1 and a feature coordinate system KO2 are defined. Wheel coordinate system KO1 and feature coordinate system KO2 are set into relation to one another in order to determine an orientation value between a reference axis and a precise wheel axis of rotation.

In accordance with the example method of the present invention, no reference element or other objects supporting the measurement need be fastened to the vehicle wheel. This significantly reduces the work needed to determine the tumbling motion. In addition, an increased degree of operational reliability is achieved, because measurement objects situated externally or fastened to the wheel need not be relied on. The methods used in the image processing have a very high degree of precision while simultaneously enabling measurements at low cost.

Due to the fact that the recording of the wheel features present on the vehicle takes place as the vehicle travels past, a very rapid determination of the tumbling motion is possible. The at least one orientation value can be integrated into subsequent methods for axle measurement, such as, e.g., the determination of the toe, the camber, or the angle of spread.

Wheel coordinate system KO1 determined for the method and feature coordinate system KO2 can be used in subsequent evaluation routines, so that the computing expense is reduced for subsequent computing routines of the evaluation device.

The example method according to the present invention is particularly economical because no additional components need be integrated into the axle measurement device. At least one image recording unit that acquires wheel features on the vehicle wheel during vehicle travel, as well as an evaluation device situated downstream, are generally part of an axle measurement device.

It is particularly advantageous if wheel coordinate system KO1 having axes XR, YR, and ZR and origin OR is defined by a wheel center of rotation in origin OR and the precise wheel axis of rotation is defined parallel to axis YR, because a very precise and simple method is used for the determination of the precise wheel axis of rotation and of the wheel center of rotation.

A further advantage results if the feature coordinate system KO2 having axes XM, YM, ZM and origin OM is defined by the position of at least two wheel features. The determination of feature coordinate system KO2 requires a lower computing expense if only two wheel features and the previously determined wheel center of rotation enter into the evaluation.

It is advantageous if the angles rx, ry, rz and/or eccentricities ex, ey, ez are determined already at the beginning of the measurement by setting coordinate systems KO1 and KO2 into relation with regard to their positions relative to one another. The values can be stored with low expense, and are quickly available for subsequent evaluation routines.

Realization in computing algorithms is particularly easy if, as an orientation value, at least one angle is used that defines the position of the precise wheel axis of rotation and of the reference axis to one another.

A method that is advantageous due to its pictorial and simple description is the description of the orientation value by at least one angle that is defined by an opening angle $\delta$ of a cone that is described by the reference axis, and/or the phase direction $\alpha$ that indicates the position of the reference axis inside the cone.

It is advantageous to use the formulas $\delta=\arccos(\cos(rx)\cos(rz))$ and $\alpha=\arctan((-\cos(rx)\sin(rz))/\sin(rx)))$, incorporating the angles rx and rz, because this enables an exact and rapid evaluation of the tumbling motion of a vehicle wheel.

A further advantage results through the determination of the temporal change of phase direction $\alpha$ over a wheel rotation, because the tumbling motion acts with different strengths, as a function of the phase direction, on the toe and on the camber of the vehicle wheel.

A particular advantage results from the use of the angles $\alpha$ and $\alpha$ for corrective measures in the context of the axle measurement, because an ideal linkage can be created between a contactless axle measurement with a likewise contactless determination of the tumbling motion.

A similar advantage results from the use of the angles rx, ry, and rz, and the eccentricities ex, ey, and ez, in the context of the axle measurement, because the contactless axle measurement gains greater precision due to the large number of values for determining the position of the tire.

BRIEF DESCRIPTION OF THE DRAWINGS

An exemplary embodiment of the present invention is shown in the figures and is explained in more detail below.

DETAILED DESCRIPTION OF EXAMPLE EMBODIMENTS

Figure 1:
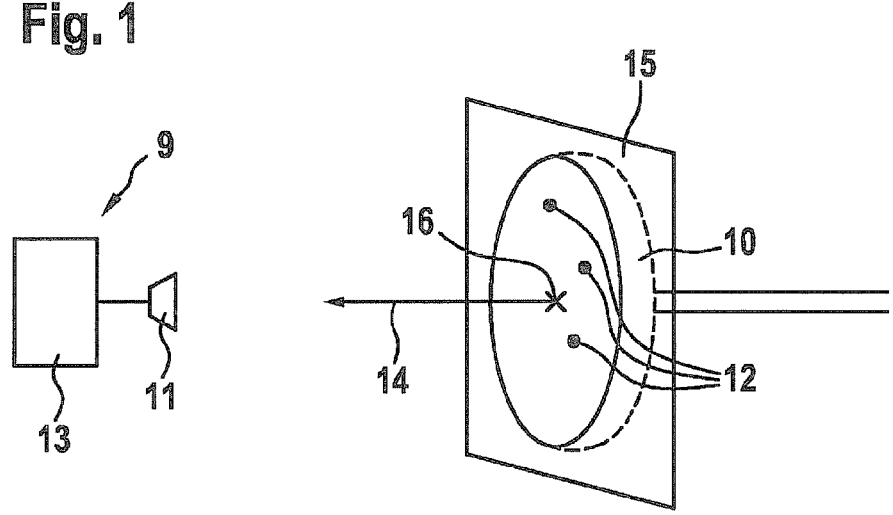
FIG. 1 shows a schematic representation of a configuration of an axle measuring device.

The configuration shown in FIG. 1 of a measurement device 9 has an image recording unit 11 that records images of a vehicle wheel 10 as the vehicle travels past, as well as an evaluation device 13. Measurement device 9 is typically part of an axle measurement device having travel rails or grooves.

Image recording unit 11 may contain a measurement camera or a plurality of measurement cameras. In addition, a configuration having a plurality of image recording units 11 is possible that simultaneously record images of all four wheels of a motor vehicle as it travels past.

Image recording unit 11 is connected to evaluation device 13, which evaluates the images recorded by image recording unit 11 and further processes them. Evaluation device 13 has a display or is connected to a workshop computer that displays the results of the evaluation. If a plurality of image recording units 11 are used to record all four wheels, these units can either be connected to a central evaluation device or can each have a separate evaluation device that can also be integrated into image recording unit 11.

According to FIG. 1, on vehicle wheel 10 there are situated at least two wheel features 12 that are either already present on vehicle wheel 10 or are additionally attached for the measurement. In addition, a measurement object can be attached on vehicle wheel 10, for example a target, on which the at least two wheel features 12 are situated. The measurement object must be connected fixedly to vehicle wheel 10, and must not change its position relative to vehicle wheel 10 during the rotational motion of vehicle wheel 10. FIG. 1 further shows a precise wheel axis of rotation 14, a wheel center of rotation 16, and a wheel plane of rotation 15 for vehicle wheel 10.

With the aid of wheel features 12 recorded by image recording unit 11 as the vehicle travels past, the precise wheel axis of rotation 14 and wheel center of rotation 16 of vehicle wheel 10 are determined. Here, conventional methods are used that back-calculate the motion of wheel features 12 on a circular path, and use this to determine the precise wheel axis of rotation 14 and wheel center of rotation 16 of vehicle wheel 10. Wheel center of rotation 16 is determined by the point of intersection of precise wheel axis of rotation 14 with the outer surface of vehicle wheel 10 or the rim. In the following, it is assumed that wheel center of rotation 16 is situated on the outer surface of vehicle wheel 10 or on the rim. However, some other point on precise wheel axis of rotation 14 may also be determined as wheel center of rotation 16. Wheel plane of rotation 15 of vehicle wheel 10 is described by a surface perpendicular to precise wheel axis of rotation 14 through wheel center of rotation 16.

With the aid of precise wheel axis of rotation 14 and wheel center of rotation 16, a Cartesian wheel coordinate system KO1 is determined. This wheel coordinate system KO1 is described by an axis XR, an axis YR, an axis ZR, and an origin OR. It is defined by wheel center of rotation 16, which is situated in origin OR, and precise wheel axis of rotation 14, which is situated parallel to axis YR. The position of axes XR and ZR can be chosen arbitrarily in wheel plane of rotation 15. Wheel coordinate system KO1 is spatially stationary, and is regarded in the following as a global coordinate system.

In addition, the 2D coordinates of wheel features 12, recorded as the vehicle travels past, are back-calculated into 3D coordinates, so that the precise position of wheel features 12 can be indicated as the vehicle travels past. A Cartesian feature coordinate system KO2 can be defined through the 3D coordinates of the at least two wheel features 12 and wheel center of rotation 16. Feature coordinate system KO2, having an axis XM, an axis YM, an axis ZM, and an origin OM, is determined by the position of the two wheel features 12 and wheel center of rotation 16. Here, the position of origin OM can be selected arbitrarily. However, it is recommended to situate origin OM in wheel center of rotation 16 of vehicle wheel 10. The two axes XM and ZM are situated in a momentary feature plane of rotation that is spanned by the at least two wheel features 12 and center of rotation 16. Instead of wheel center of rotation 16 and two wheel features 12, it is also possible for at least three wheel features 12 to span the momentary feature plane of rotation. Axis YM runs perpendicular to the momentary feature plane of rotation. Because wheel features 12 are in motion during the rotational motion of vehicle wheel 10, feature coordinate system KO2 executes a rotational motion.

If faults in the shape of the tire or the rim occur on vehicle wheel 10, vehicle wheel 10 then executes a tumbling motion. In automotive technology, this is also referred to as wheel runout. A fault in the shape of the rim can occur if the flange of the rim is not parallel to the center plane of the wheel. Further shape faults may occur due to damage after collision with an obstacle. If the above-mentioned targets are used for axle measurement, shape faults in these targets, or errors in their fastening to vehicle wheel 10, may cause device impact. In the following, the sum of all these factors that contribute to the tumbling motion are considered and are referred to as wheel runout.

Below, an example method is described for determining the tumbling motion of a vehicle wheel 10 and/or the tumbling motion of a measurement plate attached to vehicle wheel 10, in the context of an axle measurement. The tumbling motion is described by the motion of a reference axis 18, and is determined by at least one orientation value between precise wheel axis of rotation 14 and reference axis 18. For this purpose, the mentioned coordinate systems KO1 and KO2 are set into relation to one another.

Wheel coordinate system KO1, as a global coordinate system having axes XR, YR, and ZR, and having origin OR, describes wheel coordinate system KO1 of vehicle wheel 10, in which there are also situated precise wheel axis of rotation 14, wheel plane of rotation 15, and wheel center of rotation 16 of vehicle wheel 10.

Feature coordinate system KO2, having axes XM, YM, and ZM, and having origin OM, describes feature coordinate system KO2, which changes its position as a function of the wheel position.

Figure 2:
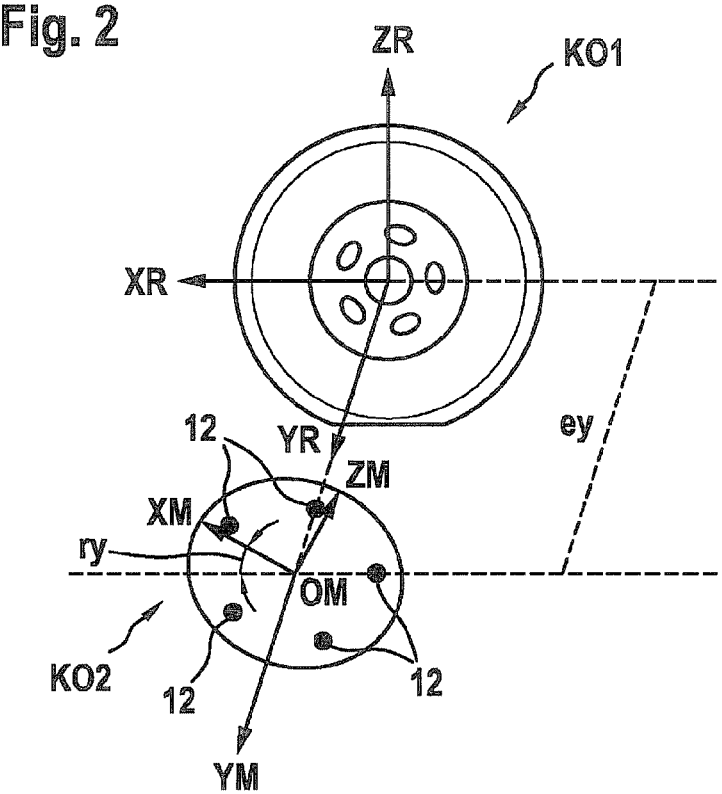
FIG. 2 shows a representation of a wheel coordinate system KO1 and a feature coordinate system KO2.
Figure 3:
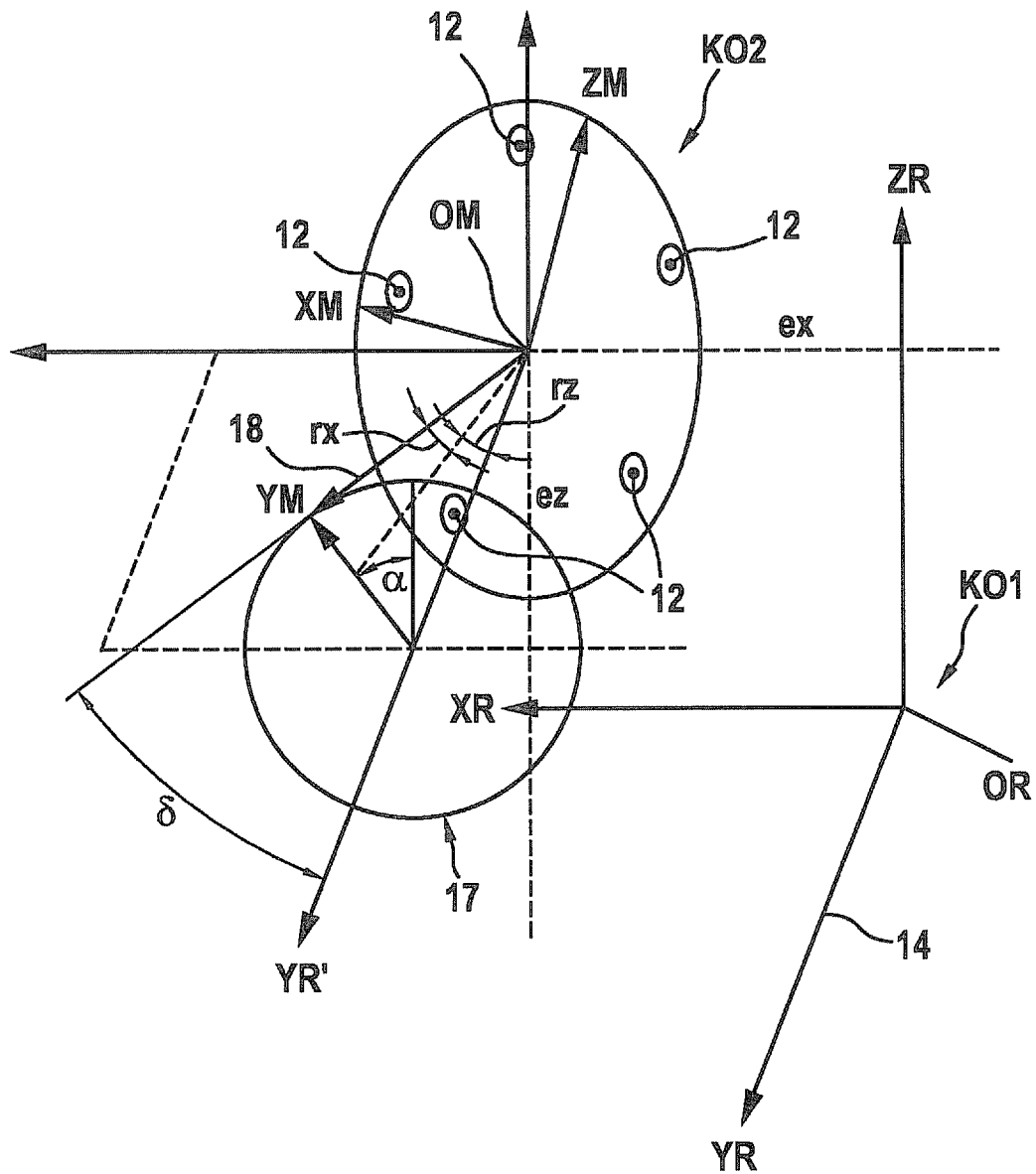
FIG. 3 shows a representation of the eccentricities and wheel runout of a vehicle wheel on the basis of wheel coordinate system KO1 and feature coordinate system KO2.

FIG. 2 and FIG. 3 show wheel coordinate system KO1 and feature coordinate system KO2. In the definition of feature coordinate system KO2, origin OM is not placed in wheel center of rotation 16, in order to illustrate the position of an eccentricity ex, an eccentricity ey, and an eccentricity ez. In addition, the drawing shows the position of an angle rx, an angle ry, and an angle rz.

The position of the two coordinate systems KO1 and KO2 relative to one another can be described by eccentricities ex, ey, and ez, and by angles rx, ry, rz. If there is an offset of the two coordinate systems KO1 and KO2, eccentricity ex indicates the magnitude of the offset along axis XR, eccentricity ey indicates the magnitude of the offset along axis YR, and eccentricity ez indicates the magnitude of the offset along axis ZR.

If the two coordinate systems KO1 and KO2 are rotated in their position relative to one another, angle rx indicates the angle between axis YR and YM, under the assumption that no translation is present and that YM has been projected into the plane YRZR. Angle ry indicates the angle between axis XR and XM, under the assumption that no translation is present and that XM has been projected into the plane XRZR. Angle rz indicates the angle between axis YR and YM, under the assumption that no translation is present and that ZM has been projected into the plane XRYR.

If wheel runout is present, axis YM of feature coordinate system KO2 describes a cone 17 about axis YR of wheel coordinate system KO1, if OM and OR are identical. Here, axis YR forms the axis of cone 17. If the two origins OR and OM are not positioned on one another, axis YM of feature coordinate system KO2 describes a cone 17 about an axis YR' that is parallel to axis YR and about which eccentricities ex, ey, and ez have been shifted (FIG. 3).

If no wheel impact is present, axes YM of feature coordinate system KO2 and YR of wheel coordinate system KO1 are parallel, and angles rx and rz are zero (rx=0°, rz=0°).

In order to determine the tumbling motion of a vehicle wheel 10, axis YM is selected as reference axis 18, and at least one orientation value is determined between reference axis 18 and precise wheel axis of rotation 14. The orientation value is indicated by a fixed quantity that is identical to an opening angle $\delta$ of cone 17, and/or by a phase direction $\alpha$ that describes the position of reference axis 18 on cone 17. Opening angle $\delta$ and phase direction $\alpha$ can be calculated using angles rx and rz, via the formulas indicated below.

Opening angle $\delta$ is calculated by a formula $$\delta=\arccos(\cos(rx)\cos(rz)).$$

Phase direction $\alpha$ is calculated by a formula $$\alpha=\arctan((-\cos(rx)\sin(rz))/\sin(rx))).$$

Because phase direction $\alpha$ is a function of the wheel position, the development over time, or the position of reference axis 18 on cone 17, can be indicated as a function of time and/or of wheel position.

Using the above-indicated method, the wheel impact can be determined precisely in the context of the axle measurement. The precise values of opening angle $\delta$ and/or phase direction $\alpha$ can be used for the determination and calculation of further relevant quantities in the axle measurement, such as toe, camber, and angle of spread.

If image recording units 11 are situated at the beginning, or in the drive-up area, of the axle measurement device, opening angle $\delta$ and/or phase direction $\alpha$ and/or further quantities ex, ey, ez, rx, ry, rz can be determined already during the approach to the measurement station, and can be integrated into the methods for axle measurement and/or into the methods for wheel orientation.

What is claimed is:

1. A method for determining at least one of tumbling motion of a vehicle wheel and tumbling motion of a measurement object attached to the vehicle wheel in the context of an axle measurement, the tumbling motion being executed relative to a precise wheel axis of rotation of the vehicle wheel, at least one orientation value being determined by an evaluation device between the precise wheel axis of rotation and a reference axis, the method comprising:
   acquiring during travel of the vehicle, by at least one image recording unit, at least two wheel features that are present on the vehicle wheel or are attached for the measurement;
   determining, by the evaluation device, a wheel coordinate system and a feature coordinate system using the recorded wheel features, the evaluation device situated downstream from the image recording unit; and
   setting, by the evaluation device, the wheel coordinate system and the feature coordinate system into relation to one another to determine the orientation value;
   wherein the orientation value is determined by at least one angle that defines the position of the reference axis and the precise wheel axis of rotation to one another; and
   wherein the angle is defined by at least one of an opening angle $\delta$ of a cone that is defined by the reference axis, and a phase direction $\alpha$ that describes the position of the reference axis on the cone.

2. The method as recited in claim 1, wherein the wheel coordinate system has an axis XR, YR, and ZR and an origin OR, and is defined through a wheel center of rotation in the origin OR, and wherein the precise wheel axis of rotation parallel to the axis YR.

3. The method as recited in claim 1, wherein the feature coordinate system has an axis XM, YM, and ZM and has an origin OM, and is defined through a position of at least two wheel features.

4. The method as recited in claim 1, wherein the wheel coordinate system and the feature coordinate system are set into relation to one another with regard to their position via at least an angle and an eccentricity.

5. The method as recited in claim 1, wherein the opening angle $\delta$ is calculated using the formula $\delta=\arccos(\cos(rx)\cos(rz))$, where rx and rz are angles.

6. The method as recited in claim 1, wherein the phase direction $\alpha$ is calculated using the formula $\alpha=\arctan((-\cos(rx)\sin(rz))/\sin(rx)))$, where rx and rz are angles.

7. The method as recited in claim 6, wherein a temporal change in the phase direction is determined via a wheel rotation.

8. The method as recited in claim 1, wherein at least one of the angle $\delta$ and the angle $\alpha$ are used for corrective measures in the context of the axle measurement of the vehicle wheel.

9. The method as recited in claim 8, wherein at least one of an angle and an eccentricity are used for corrective measures in the context of the axle measurement of the vehicle wheel.

10. The method according to claim 1, wherein the at least one image recording unit includes at least one measurement camera.

11. The method according to claim 1, wherein the evaluation device includes a display or is connected to a computer to display results of the evaluation.

12. The method according to claim 1, wherein the vehicle is a motor vehicle.

* * * * *